United States Patent [19]

Wunderlich

[11] 4,057,378

[45] Nov. 8, 1977

[54] TRAVERSING CORE ROD DETECTING DEVICE

[75] Inventor: Ernst Dieter Wunderlich, Teaneck, N.J.

[73] Assignee: Rainville Company, Inc., Middlesex, N.J.

[21] Appl. No.: 715,631

[22] Filed: Aug. 18, 1976

[51] Int. Cl.² .............................................. B29D 23/02
[52] U.S. Cl. .................................... 425/137; 425/154; 425/533
[58] Field of Search ............... 425/135, 136, 137, 154, 425/DIG. 231, DIG. 209, 242 B

[56] References Cited

U.S. PATENT DOCUMENTS

| 3,024,521 | 3/1962 | Polk | 269/321 A |
|---|---|---|---|
| 3,181,858 | 5/1965 | Daniels | 269/296 |
| 3,834,848 | 9/1974 | Farrell | 425/154 X |

*Primary Examiner*—Richard B. Lazarus
*Attorney, Agent, or Firm*—Roy C. Hopgood; John M. Calimafde; Charles W. Neill

[57] ABSTRACT

This invention is an improved apparatus for detecting residue that is left on a core rod of injection blow molding apparatus after blown articles have been stripped from the core rods at a pick-off station, and before the core rods are delivered to an injection station. The detecting apparatus moves in a straight line across a row of core rods extending from the face of an indexing head and while the core rods are stationary.

11 Claims, 3 Drawing Figures

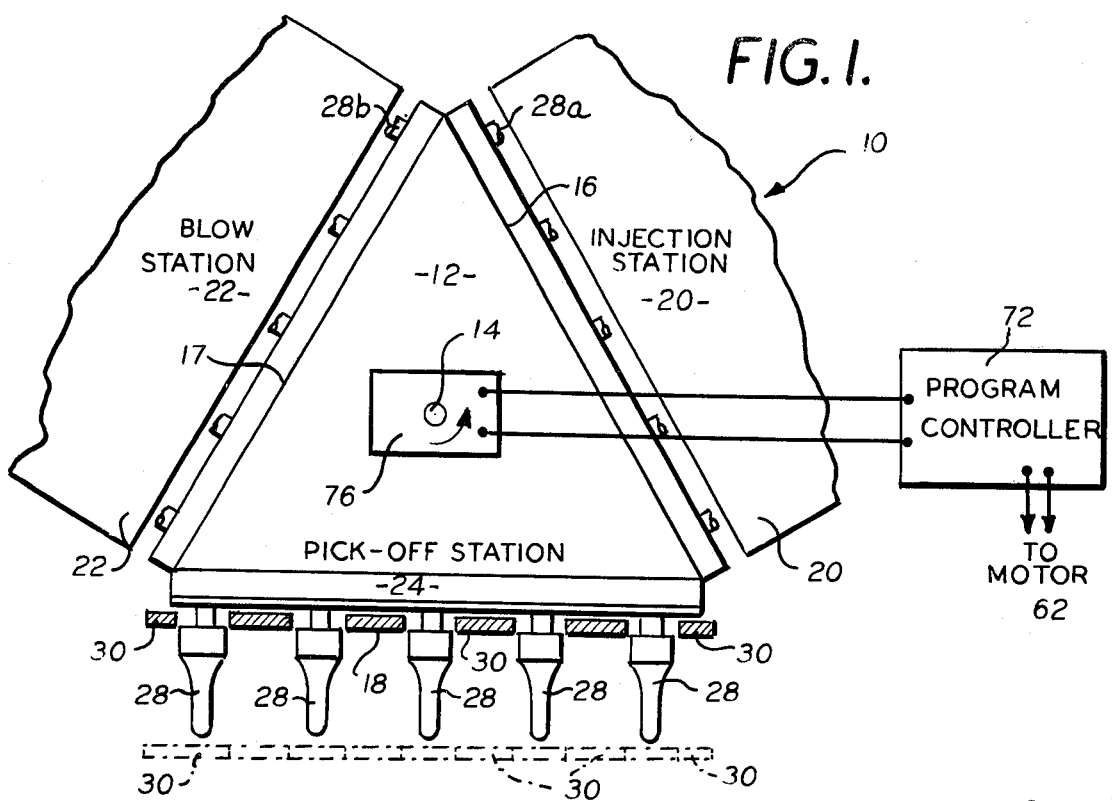
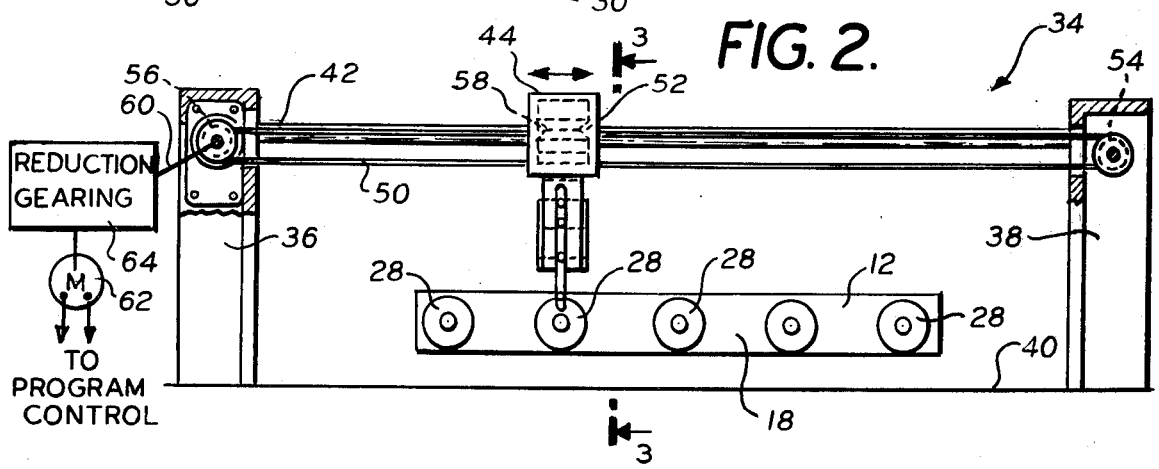
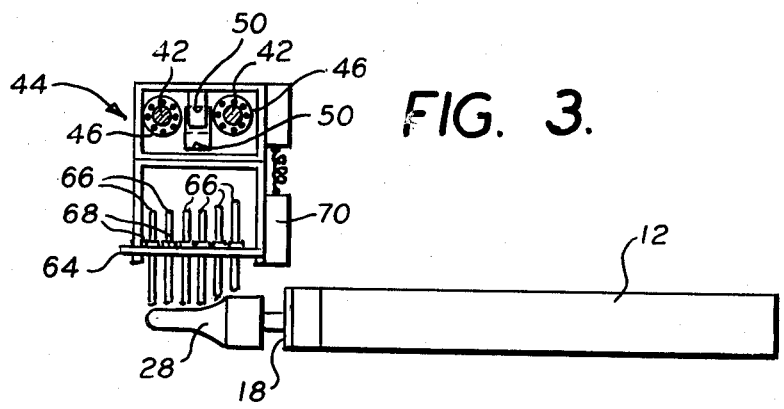

TRAVERSING CORE ROD DETECTING DEVICE

BACKGROUND AND SUMMARY OF THE INVENTION

One of the problems encountered with injection blow molding apparatus is that injection molds are damaged by core rods which have hardened residue on them when they are returned to the injection station. As a precaution, it is common practice to have means located between the pick-off station and the injection station for detecting any residue which may be left on a core rod.

Large injection blow molding machines have a plurality of core rods extending from different faces of an indexing head, and these core rods extend from a flat side face of the indexing head and are presented to each station simultaneously as the indexing head turns intermittently during the operation of the machine. Because of the fact that the core rods extend from a flat face on the side of the indexing head, they do not all travel through the same arc when moving from the pick-off station to the injection station. A rod at the center of the face is closer to the axis of rotation of the indexing head and therefore moves about a shorter radius than other rods which are located toward the opposite ends of the side face of the head and which are substantially further from the center of rotation.

Residue detecting apparatus has been used with cams for shifting the position of the core rod detector to coincide with the path of movement of successive core rods; but such cam-operated mechanism is very complicated, and the cam must be especially designed for the conditions under which it is to be used.

When using longer core rods, or substantially shaped core rods and/or core rods mounted further apart, individual cam followers for each different core rod set would have to be installed. Fast rotating indexing heads of modern machines may override detecting devices located between pick-off and injection stations. Also, such detecting devices, located between stations, cannot be used with machines in which the indexing heads are built to rotate prior to reaching their upper positions to achieve fast indexing speeds.

This invention provides a traversing core rod detecting device which is universally adaptable to all core rod shapes, lengths and mounting widths by adjusting threaded parts up or down so that their lower ends correspond to the longitudinal contour of the outside surface of each core rod.

As soon as blown containers or other articles have been stripped from the core rods at the pick-off station, the pick-off plate remains in its foremost position for several seconds; and during this period, the detecting device travels across all of the core rods successively. If any unstripped plastic is detected, the part of the detecting apparatus which contacts with the unstripped residue imparts an angular movement to the detecting apparatus and operates a micro-switch, or other device, which stops the machine until the residue can be removed from the core rod.

The residue detector is supported by a carriage which runs along a track and its motion is preferably tied in with the programming apparatus that operates the injection blow molding machine.

In the preferred embodiment of the invention, the parts of the detector which strike against residue on the core rods are preferably Nylon rods threaded to a support by which they are carried; and these rods are threaded so that they can be turned one way or the other in order to bring the ends of the rods to the necessary location adjacent to the part of a core rod across which each particular rod passes during a traverse of the detector.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is a diagrammatic top plan view showing an injection blow molding machine with core rods extending from the face of the indexing head at a pick-off station, and other core rods (broken away) at the injection station and the blow station;

FIG. 2 is a diagrammatic elevation showing the core rods at the pick-off station and showing the traversing core rod detecting device of this invention; and FIG. 3 is a diagrammatic view taken on the line 3—3 of FIG. 2 and illustrating the way in which the detecting device is adjusted to operate with core rods of different contour.

DESCRIPTION OF PREFERRED EMBODIMENT

FIG. 1 shows a blow molding machine indicated generally by the reference character 10. This machine has an indexing head 12 which rotates intermittently about the axis of a vertical shaft 14. The indexing head 12 has three faces 16, 17 and 18, which are flat and located at 120° spacing around the axis of the shaft 14.

The face 16 is shown opposite an injection station 20; the face 17 is shown opposite a blow station 22; and the face 18 is shown at a pick-off station 24, where blown articles on core rods 28 are ejected from the core rods.

The ejection operation is performed by fingers 30 which move upward on opposite sides of the core rods 28 when the indexing head 12 stops with one of its faces at the pickoff station. These fingers 30 then move away from the indexing head and into contact with articles on the core rods 28. The stroke of the fingers is sufficient to dislodge the blown articles from the core rods; and on the next angular movement of the indexing head 12, the core rods at the pick-off station 24 are moved 120° about the axis of the shaft 14 to bring the core rods of the face 24 into position at the injection station 20.

Occasionally, some of the plastic which has cooled and hardened on a core rod is not removed from the core rod at the pick-off station, and it is important to detect such plastic on a core rod before the core rod moves to the injection station, where the injection mold may be damaged if closed on a core rod which has hard plastic adhering to it.

There are similar core rods 28a projecting from the face 16 and core rods 28b projecting from the face 17. These core rods are broken off in FIG. 1 for clearer illustration. However, it will be understood that each time the indexing head turns to an angle of 120°, it brings a new set of core rods to the pick-off station 24 in accordance with the conventional operation of blow molding machines.

The mechanism for moving the fingers 30 upward between the core 28, and then moving the fingers forward toward the forward ends of the core rods is not shown in the drawing, since this is conventional mechanism for injection blow molding machines and is well understood in the art. The positions of the fingers 30, when in their forward positions, are indicated in dotted lines in FIG. 1.

This invention provides simple and rugged apparatus for detecting any residue on the core rods at the pick-off station before these core rods are advanced to the injection station. This residue detection apparatus is shown in FIGS. 2 and 3. It includes a fixed frame, indicated generally by the reference character 34. This frame 34 has rigid end supports 36 and 38 secured to an underlying structure 40 which may be a part of the blow molding machine or may be a rigid face on which the blow molding machine rests. At their upper ends, the end supports 36 and 38 are connected together rigidly by guide rods 42, which are parallel to one another and which act as a track for a carriage 44. The carriage 44 has bearings 46 which surround the guide rods 42 so that the carriage moves along the guid rods as a track.

An endless belt, preferably a wire cable 50, is connected at 52 to the carrige 44; the connection 52 is preferably at a level approximately equal to the top surfaces of the guide rods 42. This cable 50 extends parallel to the guide rods and to the right in FIG. 2, and around a pulley 54 supported by the fixed end support 38.

After passing around the pulley 54, the wire cable 50 extends to the left in FIG. 2 and around a pulley 56 rotatably supported by the fixed end support 36. After passing around the pulley 56, the wire cable 50 has its end connected to the carriage 44 by a connection 58.

The pulley 56 is driven by a shaft 60 from an electric or pneumatic motor 62 and through reduction gearing 64.

Operation of the motor 62 in a direction to rotate pulley 56 clockwise moves the carriage 44 along the guide rods 42 and to the right in FIG. 2. Reverse rotation of the motor 62 moves the carriage 44 along the guide rods 42 toward the left.

FIG. 3 shows a support 64 at the lower part of the carriage 44. This support 64 extends parallel to the axis of each of the core rods 28. A plurality of separate parts, preferably rods 66, are carried by the support 64. In the preferred construction, each of the rods 66 threads through the support 64 so that the position of the rod can be moved axially or up or down by rotating the rods.

In order to adjust the detecting apparatus of this invention for a particular core rod contour, each individual rod 66 is screwed up or down to bring it into position so that it is adjacent to but not touching the portion of the core rod 28 immediately below it. The rods are then locked in adjusted positions by lock nuts 68 on the individual rods 66.

All of the core rods 28 are located in alignment with their axes in a plane parallel to a plane through the axes of the guide rods 42. Thus the carriage 44 moves the detector rods 66 across each core rod successively and with the detector rods 66 in the same relative position as to each core rod. The traverse of the detector rods across the successive core rods is made after the ejection fingers 30 have displaced blown articles from the core rods and before the indexing head starts to move the core rods away from the pick-off station.

It will be evident that the detection apparatus of this invention operates equally well with each core rod regardless of the position of the core rod lengthwise of the indexing head face and regardless of the distance of the core rod from the axis of rotation of the indexing head. In the event that any one of the rods 66 encounters an obstruction on the core rod, the continued traversing movement of the carriage 44 causes the rods 66 to tilt the support 64 so that a limit switch in a controller 70, attached to the carriage 44, sends a signal to a program controller 72 (FIG. 1) which prevents further movement of the indexing head 12 until the obstruction can be removed from the core rod. An audible signal to the machine operator is preferably sounded at the same time.

Referring again to FIG. 3, each of the detector rods 66 is threaded for its entire length, or at least enough of its length to provide the maximum movement which may be required of it in order to have the lower ends of the rods 66 provide the desired contour to match the core rods with which they may be used. Nylon has proved to be a particularly desirable material from which to make the rods 66.

The detector switch 70 preferably stops further traverse of the carriage 44 so that there is no doubt as to which of the core rods has the obstruction on it. When the operator removes the obstruction from the core rod at which the carriage has stopped, the carriage should be operated to traverse the remaining core rods to be sure that none of the other core rods has residue on it. The carriage 44 can be programmed so as to make a round trip for each traversing operation, or it can be constructed so that it travels to the right for a complete traverse at one cycle and travels to the left for the next set of core rods that are brought to the pick-off station.

The indexing head 12 (FIG. 1) is operated by motor means designated generally by the reference character 76 and in accordance with the program controller 72. Such mechanism for moving the indexing head up and down in synchronism with the opening and closing of the molds at the injection station and blow station, and for moving the indexing head intermittently through the angles necessary to locate core rods at successive stations, are not illustrated, since this is conventional mechanism well understood in the blow molding machine art. No description of this mechanism is necessary for a complete understanding of the present invention. The program controller 72 also controls the operation of the motor 62 which starts and stops the carriage 44, as already explained.

Limit switches may be provided, if desired, as an extra precaution for limiting the stroke of the traverse of the carriage 44. The preferred embodiment of the invention has been illustrated and described, but changes and modifications can be made and some features can be used in different combinations without departing from the invention as defined in the claims.

I claim:

1. In injection blow molding apparatus having an indexing head with angularly related faces from which a plurality of core rods extend at locations spaced across the width of each face, an injection station, a blowing station, and a pick-off station at angularly spaced locations around the indexing head, and means for rotating the indexing head intermittently about a center to successively bring each face, and the core rods that extend therefrom, into position to cooperate with each of the stations, the combination comprising a carriage, a track extending lengthwise parallel to the extent of the face of the indexing head which is at rest at the pick-off station, the carriage being on said track and moveble lengthwise thereof, motor-operated motion-transmitting means that propel the carriage along the track following discharge of molded parts from the core rods at the pick-off station and only while the indexing head is stationary and prior to delivery of the rods to the injection station, a residue detector connected to and movable with the carriage transversely of the length of the core rods and extending into positions to strike against residue on each core rod while the indexing head remains at rest, if there is any residue on any of the core rods after blown objects have been stripped therefrom at the pick-off station, and a controller responsive to the striking of residue on any core rod by the detector during a traverse of the carriage across the stationary locations of the successive core rods at the pick-off station.

2. The injection blow molding apparatus described in claim 1 characterized by the track being stationary and the carriage movable along the stationary track.

3. The injection blow molding apparatus described in claim 1 characterized by the residue detector including an element defining the longitudinal contour of a core rod, a support on which the detector has relative movement with respect to the carriage and by which the controller is operated.

4. The injection blow molding apparatus described in claim 3 characterized by the detector including a plurality of parts that are adjustable to bring corresponding ends of said parts into position to correspond to the longitudinal contour of the core rods, a common support for the parts, said common support being displaced by any of the parts that strike residue on any of the core rods.

5. The injection blow molding apparatus decribed in claim 1 characterized by the detector comprising a support from which a plurality of parts extend toward the place at which the core rods are located when the carriage is closest to each of the respective core rods, the row of parts extending in the direction of the length of each core rod and with each part extending close to the surface of the core rod above which the part is located as the detector passes across each core rod.

6. The injection blow molding apparatus described in claim 5 characterized by each of said parts of the detector comprising a threaded rod which passes through a support of the detector and which is adjustable by rotating the rod to screw the threads in a direction to move the end of the rod closer to or further from the axis of a core rod to adjust the end of the rod to a position adjacent to a side of a core rod across which the end of the rod travels as the carriage moves along the track.

7. The blow molding apparatus described in claim 1 characterized by the track extending beyond the length of whatever face of the indexing head is at the pick-off station, and the carriage having a movement along the track greater than the cumulative spacing of the core rods from one another, and automatic control means for moving the carriage intermittently along the track in timed relation with the operation of the indexing head and the apparatus that strips blown articles from the core rods at the pick-off station.

8. The injection blow molding apparatus described in claim 7 characterized by programming apparatus for operating the indexing head and the equipment at the pick-off station for starting and stopping the movement of the carriage along its track, said equipment being also connected with the programming apparatus.

9. The injection blow molding apparatus described in claim 1 characterized by a stationary frame by which the track is supported, the carriage being movable along the track by a remotely located motor, and motion-transmitting means extending generally parallel to the track for transmitting motion of the motor to the carriage in either direction.

10. The injection blow molding apparatus described in claim 9 characterized by the motion transmitting means being an endless element that passes around rotary pulleys at opposite ends of the track.

11. The injection blow molding apparatus described in claim 1 characterized by the residue detector including a support that moves angularly about its axis, a control switch responsive to said movement of the support, a plurality of parts carried by the support and spaced from one another axially along the support and extending parallel to one another at right angles to the support in directions substantially normal to a plane along which the support travels as the carriage moves lengthwise of the face of the indexing head from which the core rods extend, said parts extending below the support far enough to pass adjacent to but clear of an underlying portion of a core rod located immediately below each respective part that extends downward from the support, and each of the downwardly extending parts being secured to the support and constructed and arranged to move the support angularly about its axis if any of said parts strike an obstruction on a surface of a core rod.

* * * * *